(12) United States Patent
Gapontsev et al.

(10) Patent No.: US 8,582,608 B2
(45) Date of Patent: Nov. 12, 2013

(54) HIGH POWER FIBER LASER SYSTEM WITH SIDE-PUMPING ARRANGEMENT

(75) Inventors: Valentin Gapontsev, Worcester, MA (US); Vladimir Grigoriev, Burbach (DE); Volodia Sergueev, Siegen (DE); Ilia Zaytsev, Burbach (DE)

(73) Assignee: IPG Photonics Corporation, Oxford, MA (US)

( * ) Notice: Subject to any disclaimer, the term of this patent is extended or adjusted under 35 U.S.C. 154(b) by 575 days.

(21) Appl. No.: 12/788,764

(22) Filed: May 27, 2010

(65) Prior Publication Data

US 2011/0292499 A1    Dec. 1, 2011

(51) Int. Cl.
| | |
|---|---|
| *H01S 3/067* | (2006.01) |
| *G02B 6/26* | (2006.01) |
| *G02B 6/036* | (2006.01) |
| *H04B 10/17* | (2011.01) |

(52) U.S. Cl.
USPC .............. 372/6; 359/341.3; 385/27; 385/39

(58) Field of Classification Search
USPC .................... 359/341.3; 372/6; 385/27, 39
See application file for complete search history.

(56) References Cited

U.S. PATENT DOCUMENTS

| | | | | |
|---|---|---|---|---|
| 4,546,476 | A  * | 10/1985 | Shaw et al. ...................... 372/6 |
| 6,467,969 | B1 * | 10/2002 | Shmulovich ..................... 385/54 |
| 7,286,283 | B2 * | 10/2007 | Starodoumov ........... 359/341.33 |
| 2008/0298746 | A1* | 12/2008 | Holehouse et al. .............. 385/43 |
| 2009/0092157 | A1* | 4/2009 | Gapontsev ........................ 372/6 |
| 2010/0296157 | A1* | 11/2010 | Takahashi .................. 359/341.3 |
| 2011/0123155 | A1* | 5/2011 | Kumkar et al. ................. 385/43 |

* cited by examiner

*Primary Examiner* — Eric Bolda
(74) *Attorney, Agent, or Firm* — Yuri Kateshov; Timothy J. King

(57) ABSTRACT

A twin fiber laser arrangement is configured with active and passive fibers supporting respective signal and pump lights and a reflective coating surrounding the fibers along a section of the arrangement. The passive fiber has regions covered by respective protective layer and coating-free regions alternating with the layer covered regions, wherein the reflective coating is configured to overlap the protective layer which shields the end of the reflective coating from high power pump light.

15 Claims, 2 Drawing Sheets

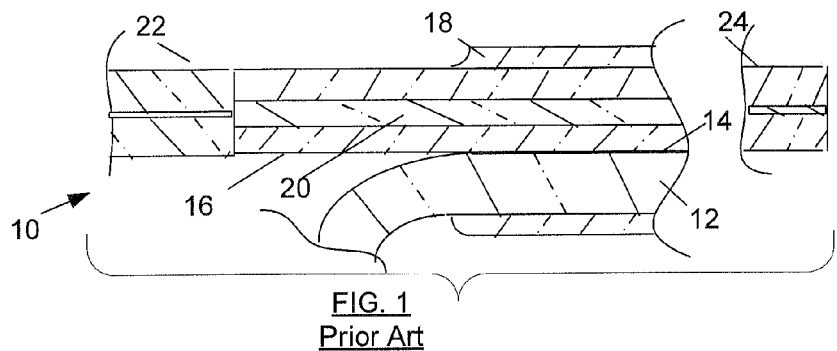
FIG. 1
Prior Art
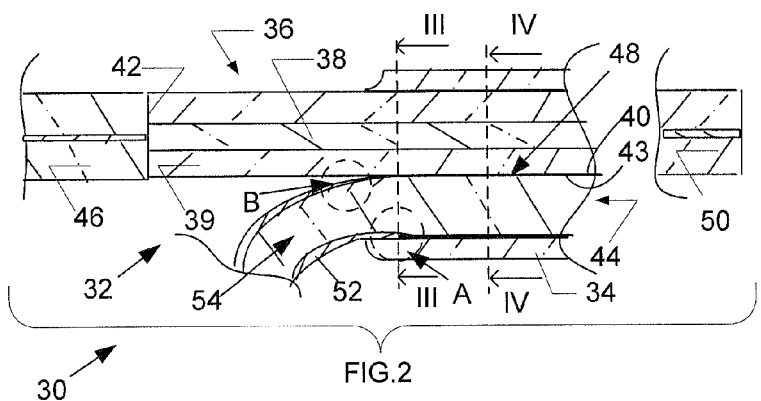
FIG. 2
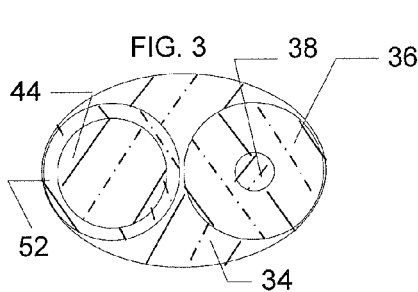
FIG. 3
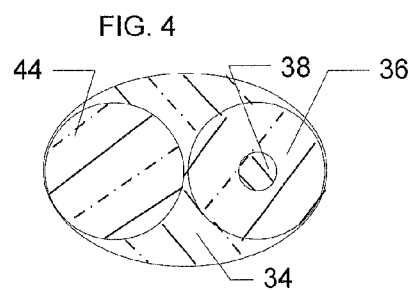
FIG. 4
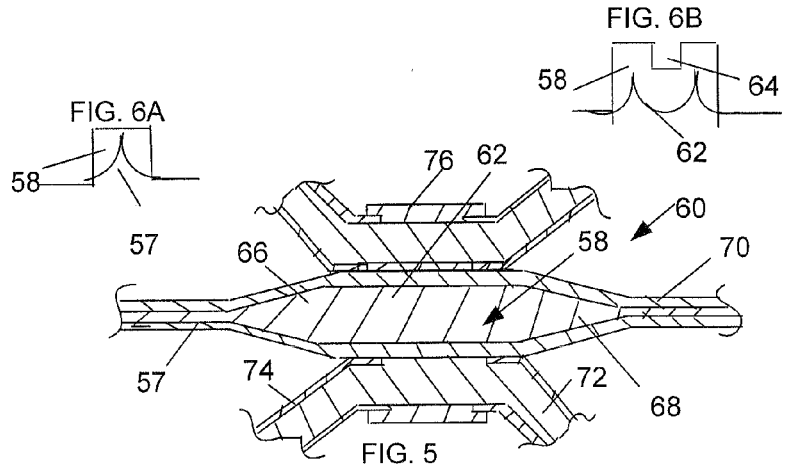
FIG. 5
FIG. 6A
FIG. 6B

HIGH POWER FIBER LASER SYSTEM WITH SIDE-PUMPING ARRANGEMENT

BACKGROUND OF THE DISCLOSURE

1. Field of the Disclosure

The disclosure relates to high power fiber laser systems and, more particularly, to high power fiber laser systems configured with a side-pumping arrangement.

2. Prior Art Discussion

High power fiber lasers and amplifiers have one or more gain blocks each typically including a multi-clad active fiber and a pump-light delivery passive fiber which are arranged in a side-pumping scheme. Completing the configuration of the gain block, such as a fiber amplifier, are typically an input passive fiber launching signal light into the active fiber and output passive fiber receiving the amplified signal light therefrom.

FIG. 1 illustrates one of the known configurations of a gain block 10 having a side-pumping arrangement, which includes a pump multi-mode passive fiber 12, a doped fiber 16, which is typically, but not necessarily, is a multimode fiber capable of supporting a fundamental mode at the desired wavelength, and a reflective coating 18. The pump and active fibers have respective stretches operatively connected to one another and defining a coupling region 14. The structure of FIG. 1 is further referred to as a twin configuration.

The active and pump fibers 16 and 12, respectively, are drawn from respective pre-forms and further guided through a furnace so as to draw respective fibers, which later are surrounded by reflective coating 18. Upon winding a twin on a reel, it is ready for use by splitting fibers 12 and 16, respectively, so that pump fiber 12 is operatively connected to a light source and doped fiber 16 to a single mode passive fiber, provided a gain block is configured as a fiber amplifier. Otherwise, the twin may be used as a seed source provided with a resonant cavity in a well known manner. Since the pumping is typically performed in opposite directions, the fibers are separated at the opposite ends of coupling region 14.

In operation, pump light, launched by passive pump delivery fiber 12, starts propagating into doped fiber 16 through end portions A of coupling region 14. As pump light propagates along coupling region 14, its major part is gradually absorbed by gain medium of a core 20 of doped fiber 16 so as to amplify signal light launched from input passive fiber 22 into core 20. The amplified signal light is further coupled into an output passive fiber 24 which guides it, for example, to a next gain block or any other recipient of the amplified light.

The practice shows that high power fiber laser systems based on one or more gain blocks similar to one of FIG. 1 may experience undesirable dispersion of high pump power at regions A which are located next to the beginning/end of coupling region 14. Even more vulnerable regions include the remaining ends of reflective coating 18 after its end portions are removed during the split of the fibers. The heat generated by such high pump powers frequently causes burning of reflective coating 18 which leads to a quick destruction of the twin structure and, thus, of the gain block.

A need therefore exists for a high power fiber laser system having at least one twin structure which is capable of withstanding high pump powers.

Still a further need exists for a process of manufacturing fibers providing the protection of high power fiber lasers of the type disclosed immediately above.

SUMMARY OF THE DISCLOSURE

These and other needs are met by the disclosed gain block provided with a fiber twin structure which includes a doped or active fiber, multimode passive fiber and an outer cladding or reflective coating surrounding connected portions of respective fibers along a coupling region.

According to one aspect, the disclosed twin structure is configured with a protective layer which includes a protective layer such as, which is based on polymers, or cladding, for example, SiF. The protective layer is configured with a refractive index smaller than that one of the core of the MM passive fiber and surrounds end portions, i.e., the portions along the opposite ends of the coupling region, of the multimode passive pump fiber. The protective layer is thus sandwiched between the end portion of the doped fiber and reflective coating and configured so that pump light is coupled into the active fiber at a distance from the end of the coupling region. Since the opposite ends of the reflective coating, which overlap the protective coating at respective end portions of the pump fiber, are not in direct contact with high pump power, the possibility of having the reflective coating burn is substantially minimized.

According to a further aspect of the disclosure, the inventive twin structure is manufactured by a process specifically designed to produce a pump fiber with regions of the protective layer. In particular, a preform for passive pump fibers has alternating radially relatively large and radially relatively small regions, wherein the relatively large regions correspond to the end portions of the pump fiber intended to protect the ends of the reflective cladding.

Alternatively, the disclosed process is based on providing the ends of the MM passive fiber with a polymer-based coating. In this case, the preform for the passive fiber has rather a cylindrical shape, i.e., the preform has a uniform diameter. The layer of the protective polymer-based coating is applied to selected end regions of the passive preform

BRIEF DESCRIPTION OF THE DRAWINGS

The above and other needs, features and advantages of the disclosed structure will become readily apparent from the following drawings, in which:

FIG. 1 is an elevated side view of one of the known twin structure.

FIG. 2 is an elevated side view of the disclosed twin structure.

FIG. 3 is a cross-sectional view of the system of FIG. 2 taken along lines III-III.

FIG. 4 is a cross-sectional view of the system of FIG. 2 taken along lines IV-IV.

FIG. 5 is an elevated view of the disclosed twin structure with an alternative configuration of the doped structure.

FIGS. 6A and 6B illustrate Gaussian and twin-peak intensity field distributions, respectively, along a MM core of active fiber capable of supporting substantially a fundamental mode at the desired wavelength.

SPECIFIC DESCRIPTION

Figure 7:
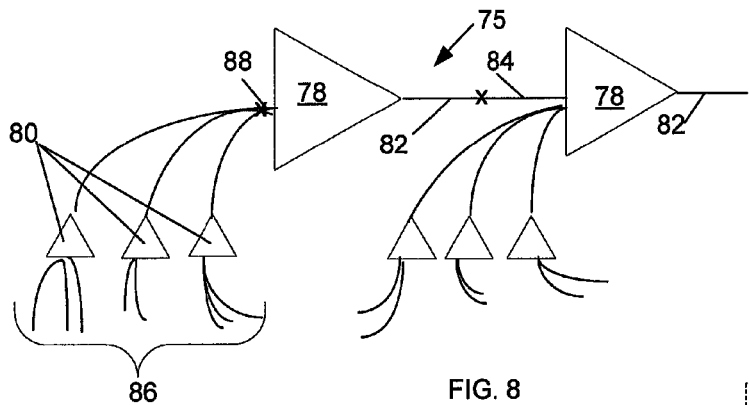
FIG. 7 is an exemplary high power multi-cascaded fiber laser system having gain blocks each configured in accordance with FIG. 2.

Reference will now be made in detail to the disclosed system. Wherever possible, same or similar reference numerals are used in the drawings and the description to refer to the same or like parts or steps. The drawings are in simplified form and are far from precise scale. For purposes of convenience and clarity only, the terms "connect," "couple," and similar terms with their inflectional morphemes do not necessarily denote direct and immediate connections, but also include connections through mediate elements or devices.

FIG. 2 illustrates a gain block 30 provided with the disclosed twin fiber structure 32. The twin structure 32 is configured to prevent burning of a reflective coating or outer cladding 34, which, otherwise, inevitably leads to the destruction of high power gain bloc 30 which may output of up to a kW level radiation.

The twin structure 32 includes an active fiber 36 having a core 38, which is doped with rare-earth ions to amplify light signal, as well known to an ordinary skilled worker in the fiber laser arts, and a wave-guiding cladding 39 surrounding core 38. The waveguide cladding 39 includes a stretch 40 terminating at a distance from opposite ends 42 of active fiber 36 (only one is shown) and is operatively connected to a stretch 43 of passive pump fiber 44 in a side-by-side arrangement. The passive pump fiber 44 supports pump light generated by a source disclosed hereinbelow and not shown in this figure. The combination of active and passive fibers 36 and 44, respectively, defines a side pumping arrangement, whereas connected stretches 43 and 40 of the respective fibers define a coupling region 48. Note, however, that the twin, i.e., two-fiber structure, is disclosed as an example. As an artisan readily realizes, a side pumping arrangement may include three and more fibers. For example, in case of a three-fiber structure, two identically configured MM passive pump fibers flank the active fiber, as shown in FIG. 5.

Assuming that gain block 30 is configured as a fiber amplifier, during its use, an upstream passive fiber 46 launches signal light into core 38 of active fiber 36 which guides the signal light along a light path towards an output passive fiber 50. The signal light is substantially stronger than noise or amplified spontaneous emission (ASE) inherent in the configuration of any MM fiber.

Often a high power fiber laser system (HPFLS) is required to radiate a bright, substantially diffraction-limited light. To meet this requirement, core 38 of active fiber 36 is configured to support multiple modes, but at the desired wavelength, core 38 is capable of guiding substantially a single, typically fundamental, mode. The passive input and output passive fibers 46 and 50, respectively, are configured as single mode fibers directly fused to respective opposite ends 42 of active fiber 36. Propagating along core 38 modes all extract and, therefore, compete for energy of pump light, which is coupled into active fiber 36 along coupling region 48. However, due to the configuration of active fiber 36, the lion's share of the pump light energy is absorbed by a fundamental mode, which is thus so amplified that amplification of higher modes does not exceed that one of the fundamental mode.

The active and passive fibers are configured so that a mode field diameter (MFD) of the single mode supported by the input and output fibers and the MFD of the fundamental mode supported by MM core 39 substantially match one another. This configuration allows for minimal coupling losses as light signal propagates through the interface between passive and active fibers.

The passive pump fiber 44 supports multiple modes and is capable of delivering high-power pump light into wave-guiding cladding 39 of active fiber 36. Particularly vulnerable parts of twin structure 32 include regions A corresponding to the opposite ends of reflective coating 34, and regions B, which flank coupling region 48 and where passive and active fibers 44 and 36, respectively, are separated. Note, however, that where local requirements do not call for a substantially diffraction limited output, active and passive fibers may be configured as unconditional multimodes.

FIG. 3, in addition to FIG. 2, illustrates one of the salient features of the disclosure. Particularly, the end portions of pump fiber 44 each are provided with a protective layer 52 configured to at least minimize and, preferably, prevent direct contact of pump light with regions A and B. The coated ends 54 typically correspond to respective stretches of pump fiber 44 which are separated from respective portions of active fiber 36 flanking coupling region 48. The inner ends of respective protective layer 52 each overlap the inner face of reflective coating 34. The configuration of coated fiber ends 54 of MM pump fiber 44 reliably shields regions A and B from high pump powers and, thus, substantially minimizes the possibility of burning ends regions of reflective coating 34.

FIG. 4 illustrates a cross section of a midsection of pump fiber 44 extending along coupling region 48 and, may be substantially free from a layer of protective layer 52, Note that while coated ends 54 of MM passive 44 are disclosed to have a relatively large diameter, if compared to the rest of the passive fiber, these ends may be of the same diameter or even smaller diameter than the rest of fiber 44. The diameter of passive MM pump fiber 44 is entirely a function of the speed at which the passive preform is supplied. However, regardless of the diameter of the shielded ends, passive MM pump fiber 44 is provided with alternating shielded and unprotected regions. A relatively thin layer, still surrounding MM pump fiber 44 along the midsection, may be too thin, to prevent pump light from coupling into active fiber 36 along coupling region 48 or be completely removed. Preferably, protective layer 52 is a cladding including silicon fluoride (SiF), but the latter is not the only one possibility. Other glasses with a sufficiently low refractive index as compared to the waveguide core may be used as well. Furthermore, as mentioned above, protective layer 52 may include polymer-based coatings.

FIG. 5 illustrates a side pumping arrangement with a modified active fiber 60 which is further referred to as a bottleneck- or double bottleneck-shaped fiber. As mentioned above, to generate a substantially diffraction limited light, the condition of mode matching between SM input and active fibers is necessary, whereas the strength of the light signal compared to ASE is a sufficient condition. The corollary of the latter is a high efficiency with which light signal is coupled into core 58, which can be calculated from an overlap integral of the two field distributions, as known to an artisan. If these conditions are met, active MM fiber 60 emits light in a substantially fundamental mode.

Referring to FIGS. 6A and 6B in addition to FIG. 5, the bottleneck or double bottleneck shape of active fiber 60, as disclosed in U.S. Pat. No. 8,068,705 which is fully incorporated herein by reference, perhaps serves as a good example of the above-discussed conditions and. The end region 57 of active fiber 60 has a relatively small core diameter substantially matching that one of the input SM passive fiber which leads to the excitation of predominantly fundamental mode with a Gaussian shape of FIG. 6A. The midsection 62 is intentionally enlarged to allow for high pump light powers to be coupled into active fiber 60 which remains relatively short to minimize the undesirable nonlinear effects, as realized by an artisan.

However, a Gaussian mode does not ideally cover the end cross-section of core's midsection 62 leaving enough pump energy for undesirable amplification of high order modes. To prevent the latter, the refractive index of core 58 along midsection 62 is configured with a controlled dip 64 expanding and transforming the Gaussian shape into a twin-peak or ring shape of FIG. 6B that has a relative large effective area minimizing excitation of higher modes. An expanding, mode transforming area 66 bridges the relatively small-diameter end and relatively large-diameter midsection regions of fiber 60 and is configured with a gradually increasing dip responsible for transformation of the Gaussian shape into the ring shape of the fundamental mode. The expansion is gradual, adiabatic—the configuration limiting the excitation of higher modes. The active fiber 60 may, thus, has only input end, mode transforming and midsection regions, or, as shown in FIG. 5, it also may have additional output mode-transforming and end regions 68 and 70, respectively, shaping the ring shape back to the Gaussian one. Note that the ring shape of the fundamental mode is optional; polygonal shapes including, for example, a rectangular one may, at the very least, be equally effective. Completing the side-pumping arrangement of FIG. 5 is a pump fiber 72 having a coupling region, which extends along midsection 62 of fiber 60, and outer reflective coating 72. In accordance with the spirit of this disclosure, protective coating 74, preventing damage to reflective coating 76, blanket end stretches of pump fiber 72.

FIG. 7 illustrates an exemplary high power fiber laser system 75 including multiple gain blocks 76 each configured in accordance with FIGS. 2 and/or 5. The pump may include a plurality of laser diodes 86. The latter may generate pump light directly coupled into gain block 76. Preferably, these laser diodes generate light coupled into pump fiber lasers 80 which, in turn are combined into a MM pump delivery fiber 88 defining with an active fiber, protective and reflecting coatings a twin configuration inside gain block 78. One of the gain blocks may be configured as an oscillator having, in addition to the structures of respective FIGS. 2 and 5, a resonant cavity defined between two or more reflectors, as well known to one of ordinary skills in the laser arts.

The pump and signal wavelengths may be selected in accordance with local requirements. For example, pump lasers 80 each may include Yb and Er ion-doped fibers each radiating the pump light at a pump wavelength of about 1530-1600 nm, whereas the active fiber within gain block 76 is doped with Tm ions and generates a system signal within a range between about 975-2100 nm wavelength. Alternatively, pump fiber lasers 80 may be configured with a Raman shifter generating the pump light at the pump wavelength which varies between about 1480 to about 1510 nm, whereas the active fiber of gain blocks 76 is doped with Er ions so as to generate the system signal at about or above 1530 nm. Further, pump fiber lasers 80 are doped with Nd ions each generating the pump light at the pump wavelength ranging between about 920 to about 945 nm, whereas the active fiber within the gain block is doped with Yb ions so as to generate the system signal in a range between about 974 to about 1000 nm. Still a further configuration of system 75 has pump fiber lasers 80 each having active fiber with an Yb-doped core which generates the pump light at the pump wavelength from about 1000-1030 nm, whereas the active fiber is doped with Yb ions so as to generate the system signal in a range between about 1050 to about 1100 nm.

Figure 8:
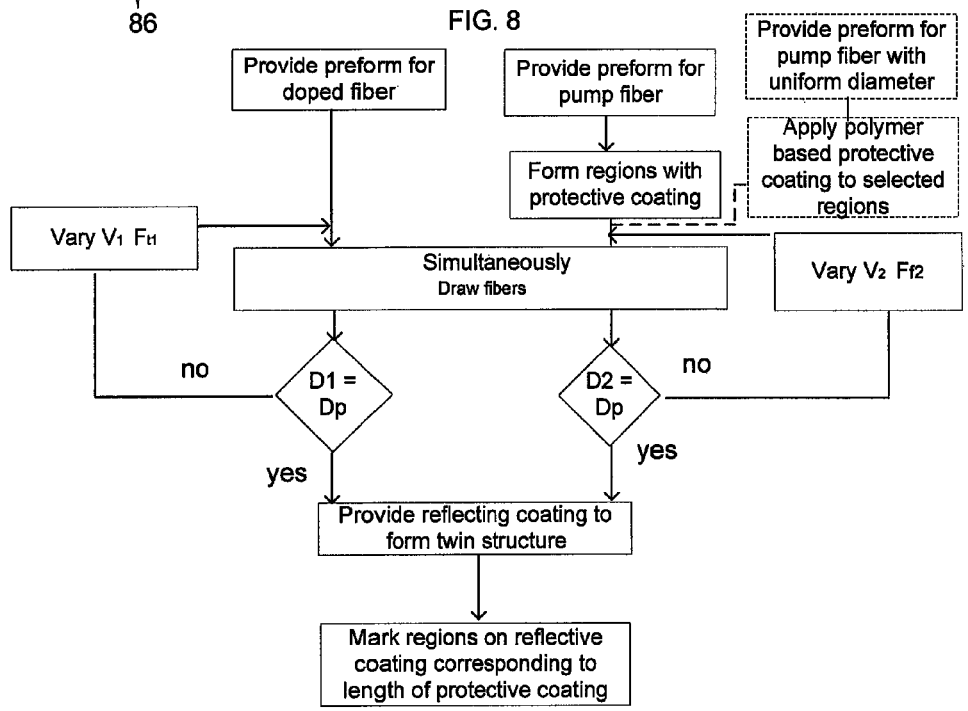
FIG. 8 is a flow chart illustrating the steps of disclosed process with a passive preform provided with a protective cladding and protective coating.

FIG. 8 illustrates a diagrammatic flow chart of the disclosed process for manufacturing the twin structures of FIGS. 2 and 5. Like a typical fiber-manufacturing process, the disclosed process begins with providing two pre-forms from which respective active and passive pump fibers of the disclosed twin structure are to be drawn. In the embodiment directed to SiF cladding, the passive fiber preform has a relatively thick layer of SiF. Upon determining the desired length of the coupling region, a portion of SiF, removed along a stretch of the passive fiber, is shorter than the determined length of the coupling region. The remaining portions of the passive fiber having respective SiF cladding [coating] or polymer-based coating correspond to shielded end portions of the passive fiber to be drawn.

As shown in phantom lines, a further embodiment disclosing protective layer 52 made from a polymer-based coating, includes applying the coating along selected regions a uniformly-dimensioned passive preform. The length of the coating-shielded regions is traced during the entire duration of the process.

The following step includes simultaneous drawing of fibers through a furnace. The structure of FIG. 2, i.e., where the active fiber has a uniform diameter, is a result of uniform speeds with which both types of fibers are drawn and uniform tension forces affecting this step. While drawing, the diameters of the respective fibers are continuously monitored and if deviation from the desired geometry is detected, the speed "v" and tension forces Ft are varied to establish the desired parameters. Moreover, once the diameter of the passive fiber is detected to correspond to the large regions of SiF cladding, the length of the fiber is continuously monitored. As the fibers are passing though a filler with polymer constituting a reflective coating, the control system registers the beginning of the enlarged region of the passive and lets the latter to be further drawn for a predetermined length at the end of which a further mark is placed upon the reflective coating. The adjacent marks spaced at the predetermined distance indicate the end portion of passive fiber coated with the protective coating.

Figure 9A:
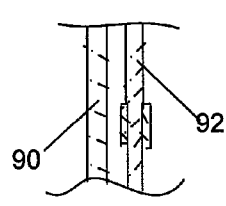
FIGS. 9A, 9B and 9C illustrate the disclosed twin structure before and after the pump and doped fibers are separated.
Figure 9B:
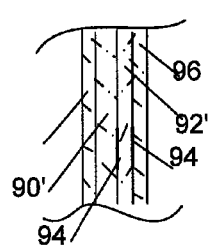
Figure 9C:
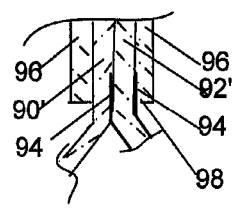

FIGS. 9A, 9B and 9C illustrate respective three major transformations passive preform 92 and active preform 90 (FIG. 9A) undergo through the process. FIG. 9B illustrates the step of applying a reflective coating 96 to active and passive fibers 90' and 92'. The thicker lines correspond to end portions of passive fiber 92' provided with a protective layer 94. When the twin structure is ready and wound up on a spool, the user may unwind the desired length of the twin and determine marks thereon. Further, the user removes a portion of reflective coating 96 leaving ends 98 thereof in less than ideal condition. These are the ends that may cause the destruction of the twin structure. Upon the removal of the reflective coating as shown in FIG. 9C, the ends of passive and active fibers 92' and 90', respectively, are separated with protective layer 94 reliably shielding ends 98 of reflective coating 96 from high powers of the pump light.

Although there has been illustrated and described in specific detail and structure of operations it is clearly understood that the same were for purposes of illustration and that changes and modifications may be made readily therein by those skilled in the art without departing of the spirit and the scope of this invention.

The invention claimed is:

1. A fiber laser arrangement comprising:
    an active fiber having a core doped with a gain medium;
    at least one passive pump fiber guiding pump light, midsections of respective active and passive fibers being operatively connected to one another along a coupling region which is dimensioned so that the pump light is substantially absorbed by the gain medium, the active and pump fibers having respective spaced apart end sections bordering the coupling region;
    a protective layer provided over the end section of the pump fiber and having an end region terminating within the coupling region; and
    a reflective layer surrounding the active and pump fibers substantially along the coupling region, wherein the end region of the protective layer overlaps an end region of the reflective layer so as to prevent the pump light from directly contacting the end region of the reflective layer.

2. The fiber laser arrangement of claim 1, wherein the reflective layer includes glass-composition material with a refractive index smaller than an adjacent region of the active fiber.

3. The fiber laser arrangement of claim 2 further comprising a passive output fiber used to one of opposite ends of the active fiber, the active, pump and output fibers are enclosed in a housing to define a gain block.

4. The fiber laser arrangement of claim 1 further comprising an additional pump fiber, the one and additional pump fibers being identically configured and flanking the active fiber.

5. The fiber laser arrangement of claim 3 further comprising an input passive fiber fused to the other end of the active fiber within the gain block, the input and output passive fibers each being configured to support a single mode, the core of the active fiber being configured to support multiple modes.

6. The fiber laser arrangement of claim 5, wherein the multimode core of the active fiber is configured to support substantially only a fundamental mode at a predetermined wavelength, the passive input, output and active fibers being configured so that the single modes supported by respective input and output passive fibers each have a mode field diameter substantially matching a mode field diameter of the fundamental mode.

7. The fiber laser arrangement of claim 6, wherein the core of the active fiber is configured with a uniform diameter or a varying diameter.

8. The fiber laser structure of claim 7, wherein the core of the active fiber has an input part with a relatively small diameter, an amplifying part with a relatively large diameter, and a mode transforming, adiabatically expanding part bridging the input and amplifying parts.

9. The fiber laser arrangement of claim 8, wherein the fundamental mode supported by the active fiber at the predetermined wavelength has
a substantially Gaussian intensity profile along the input part of the core,
an intensity profile differing from the Gaussian profile along the amplifying part of the core, and
the mode transforming part of the core being configured to transform the Gaussian profile into the profile differing from the Gaussian.

10. The fiber laser arrangement of claim 9, wherein the amplifying part of the core is configured to have a refractive index profile having a controllably formed uniform dip, the mode transforming part being configured to have a refractive index profile provided with a gradually increasing dip.

11. The twin fiber laser arrangement of claim 10, wherein the core of the active fiber further has an adiabatically narrowing mode transforming part extending from the amplifying part and an output part, the fundamental mode being re-transformed into the Gaussian profile along the output part and coupled substantially losslessly into the single mode output passive fiber.

12. The twin fiber laser arrangement of claim 3 further comprising at least one additional gain block, one of the gain blocks being configured as an oscillator and the other as an amplifier, the passive pump fiber being configured to support multiple modes.

13. The twin fiber laser arrangement of claim 1 further comprising a plurality of pump light sources selected from the group consisting of laser diodes, fiber lasers and a combination thereof, the pump light sources generating respective pump outputs combined together into the pump light which is coupled into the passive pump fiber.

14. The twin fiber laser arrangement of claim 13, wherein the fiber lasers each are doped with a combination selected from the group consisting of:
Yb and Er ions, the fiber lasers each radiating the pump light at a pump wavelength of about 1530-1600 nm whereas the active fiber is doped with Tm ions and generates a system signal within a range between about 975-2100 nm wavelength,
a Raman shifter generating the pump light at the pump wavelength which varies between about 1480 to about 1510 nm, whereas the active fiber is doped with Er ions so as to generate the system signal at about or above 1530 nm,
Nd ions, the fiber lasers each generating the pump light at the pump wavelength ranging between about 920 to about 945 nm, whereas the active fiber is doped with Yb ions so as to generate the system signal in a range between about 974 to about 1000 nm, and
Yb ions, the fiber lasers each generating the pump light at the pump wavelength from about 1000-1030 nm, whereas the active fiber is doped with Yb ions so as to generate the system signal in a range between about 1050 to about 1100 nm.

15. The twin fiber laser arrangement of claim 1, wherein the midsection of the pump fiber is uniformly dimensioned.

* * * * *